US012808748B1

(12) United States Patent
Duquette

(10) Patent No.: US 12,808,748 B1
(45) Date of Patent: Nov. 24, 2026

(54) SYSTEMS AND METHODS FOR IDENTIFYING POORLY SEALED ELECTRONIC DISPLAY ASSEMBLIES, ELECTRONIC DISPLAY ASSEMBLIES IMPLEMENTING THE SAME

(71) Applicant: Manufacturing Resources International, Inc., Alpharetta, GA (US)

(72) Inventor: Ryan Duquette, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 51 days.

(21) Appl. No.: 18/974,180

(22) Filed: Dec. 9, 2024

Related U.S. Application Data

(60) Provisional application No. 63/614,221, filed on Dec. 22, 2023.

(51) Int. Cl.
*G01M 11/08* (2006.01)
*G01M 3/00* (2006.01)
*G01M 3/26* (2006.01)

(52) U.S. Cl.
CPC ............ *G01M 11/08* (2013.01); *G01M 3/002* (2013.01); *G01M 3/26* (2013.01)

(58) Field of Classification Search
None
See application file for complete search history.

(56) References Cited

U.S. PATENT DOCUMENTS 3,504,528 A 4/1970 Weinberg et al.
3,807,220 A 4/1974 Ottenstein et al.
4,527,804 A 7/1985 Spencer
5,162,785 A 11/1992 Fagard
5,168,961 A 12/1992 Schneider
(Continued)

FOREIGN PATENT DOCUMENTS

AU 2016321400 B2 9/2019
CN 203277867 U 11/2013
(Continued)

OTHER PUBLICATIONS

Photo Research, Inc., PR®-650 SpectraScan® Colorimeter, 1999, 2 pages.
Texas Advanced Optoelectronic Solutions Inc., TCS230 Programmable Color Light-To-Frequency Converter, Dec. 2007, 12 pages.
(Continued)

*Primary Examiner* — Christopher Braniff
(74) *Attorney, Agent, or Firm* — Standley Law Group LLP; Jeffrey S. Standley; Adam J. Smith

(57) ABSTRACT

Display units, systems, and methods for identifying poorly sealed display units are disclosed. Pressure and temperature data from pressure and temperature sensors of the display units, each including at least one electronic display, is received. A neural network is trained in a supervised learning fashion on the data. Additional pressure and temperature data from pressure and temperature sensors of a same or different set of display units ("analyzed units") is received and analyzed using the neural network to identify any one or more of the analyzed units which is poorly sealed ("indicated unit(s)"). An alert is transmitted to at least one remote electronic device which includes identifying information for the indicated unit(s).

20 Claims, 9 Drawing Sheets

(56) References Cited

U.S. PATENT DOCUMENTS

| | | | |
|---|---|---|---|
| 5,228,339 | A | 7/1993 | Maresca, Jr. et al. |
| 5,322,051 | A | 6/1994 | Patterson et al. |
| 5,351,201 | A | 9/1994 | Harshbarger, Jr. et al. |
| 5,590,831 | A | 1/1997 | Manson et al. |
| 5,751,346 | A | 5/1998 | Dozier et al. |
| 5,786,801 | A | 7/1998 | Ichise |
| 5,952,992 | A | 9/1999 | Helms |
| 6,042,443 | A | 3/2000 | Carella et al. |
| 6,144,359 | A | 11/2000 | Grave |
| 6,157,143 | A | 12/2000 | Bigio et al. |
| 6,158,692 | A | 12/2000 | Abild et al. |
| 6,215,411 | B1 | 4/2001 | Gothard |
| 6,222,841 | B1 | 4/2001 | Taniguchi |
| 6,259,492 | B1 | 7/2001 | Imoto et al. |
| 6,374,187 | B1 | 4/2002 | Knight et al. |
| 6,384,736 | B1 | 5/2002 | Gothard |
| 6,421,694 | B1 | 7/2002 | Nawaz et al. |
| 6,509,911 | B1 | 1/2003 | Shimotono |
| 6,526,807 | B1 | 3/2003 | Doumit et al. |
| 6,546,294 | B1 | 4/2003 | Kelsey et al. |
| 6,553,336 | B1 | 4/2003 | Johnson et al. |
| 6,556,258 | B1 | 4/2003 | Yoshida et al. |
| 6,587,525 | B2 | 7/2003 | Jeong et al. |
| 6,701,143 | B1 | 3/2004 | Dukach et al. |
| 6,753,842 | B1 | 6/2004 | Williams et al. |
| 6,771,795 | B1 | 8/2004 | Isnardi |
| 6,812,851 | B1 | 11/2004 | Dukach et al. |
| 6,821,179 | B2 | 11/2004 | Ando |
| 6,850,209 | B2 | 2/2005 | Mankins et al. |
| 6,955,170 | B1 | 10/2005 | Mullins et al. |
| 6,968,375 | B1 | 11/2005 | Brown |
| 7,007,545 | B1 | 3/2006 | Martinek |
| 7,038,186 | B2 | 5/2006 | De Brabander et al. |
| 7,064,672 | B2 | 6/2006 | Gothard |
| 7,319,862 | B1 | 1/2008 | Lincoln et al. |
| 7,330,002 | B2 | 2/2008 | Joung |
| 7,369,058 | B2 | 5/2008 | Gothard |
| 7,380,265 | B2 | 5/2008 | Jensen et al. |
| 7,391,317 | B2 | 6/2008 | Abraham et al. |
| 7,451,332 | B2 | 11/2008 | Culbert et al. |
| 7,474,294 | B2 | 1/2009 | Leo et al. |
| 7,516,223 | B2 | 4/2009 | Whitehead |
| 7,577,458 | B2 | 8/2009 | Lin |
| 7,581,094 | B1 | 8/2009 | Apostolopoulos et al. |
| 7,595,785 | B2 | 9/2009 | Jang |
| 7,612,278 | B2 | 11/2009 | Sitrick et al. |
| 7,614,065 | B2 | 11/2009 | Weissmueller, Jr. et al. |
| 7,636,927 | B2 | 12/2009 | Zigmond et al. |
| 7,658,787 | B2 | 2/2010 | Morse et al. |
| 7,675,862 | B2 | 3/2010 | Pham et al. |
| 7,679,279 | B2 | 3/2010 | Kamio et al. |
| 7,751,813 | B2 | 7/2010 | Varanda |
| 7,764,280 | B2 | 7/2010 | Shiina |
| 7,774,633 | B1 | 8/2010 | Harrenstien et al. |
| 7,795,821 | B2 | 9/2010 | Jun |
| 7,882,728 | B2 | 2/2011 | Kizaki et al. |
| 7,889,852 | B2 | 2/2011 | Whitehead |
| 7,949,893 | B1 | 5/2011 | Knaus et al. |
| 8,074,627 | B2 | 12/2011 | Siddiqui et al. |
| 8,212,921 | B2 | 7/2012 | Yun |
| 8,218,812 | B2 | 7/2012 | Sugimoto et al. |
| 8,248,203 | B2 | 8/2012 | Hanwright et al. |
| 8,336,369 | B2 | 12/2012 | Mahoney |
| 8,441,574 | B2 | 5/2013 | Dunn et al. |
| 8,483,554 | B2 | 7/2013 | Takimoto et al. |
| 8,601,252 | B2 | 12/2013 | Mendelow et al. |
| 8,612,608 | B2 | 12/2013 | Whitehead |
| 8,654,302 | B2 | 2/2014 | Dunn et al. |
| 8,689,343 | B2 | 4/2014 | De Laet |
| 8,767,165 | B2 | 7/2014 | Dunn |
| 8,854,595 | B2 | 10/2014 | Dunn |
| 8,881,576 | B2 | 11/2014 | Schwartz et al. |
| 8,983,385 | B2 | 3/2015 | Macholz |
| 9,026,686 | B2 | 5/2015 | Dunn et al. |
| 9,147,194 | B1 | 9/2015 | Le et al. |
| 9,363,262 | B1 | 6/2016 | Wilkes |
| 9,760,151 | B1 | 9/2017 | Hou |
| 9,812,047 | B2 | 11/2017 | Schuch et al. |
| 10,120,498 | B2 | 11/2018 | Gray |
| 10,170,076 | B2 | 1/2019 | Wang et al. |
| 10,174,519 | B1 | 1/2019 | Carpenter et al. |
| 10,296,108 | B2 | 5/2019 | Gray et al. |
| 10,311,763 | B2 | 6/2019 | Greenfield |
| 10,325,536 | B2 | 6/2019 | Schuch et al. |
| 10,353,785 | B2 | 7/2019 | Dunn et al. |
| 10,578,658 | B2 | 3/2020 | Dunn et al. |
| 10,593,175 | B1 | 3/2020 | Jennings et al. |
| 10,706,752 | B2 | 7/2020 | Greenfield |
| 10,908,863 | B2 | 2/2021 | Newnham et al. |
| 11,093,355 | B2 | 8/2021 | Dunn et al. |
| 11,131,453 | B2 | 9/2021 | Kim et al. |
| 11,137,847 | B2 | 10/2021 | Dunn |
| 11,243,733 | B2 | 2/2022 | Newnham et al. |
| 11,402,940 | B2 | 8/2022 | Dunn |
| 11,455,138 | B2 | 9/2022 | Newnham et al. |
| 11,614,911 | B2 | 3/2023 | Newnham et al. |
| 11,644,921 | B2 | 5/2023 | Dunn |
| 11,645,029 | B2 | 5/2023 | Newnham et al. |
| 11,762,231 | B2 | 9/2023 | Dunn et al. |
| 11,803,344 | B2 | 10/2023 | Newnham et al. |
| 11,822,171 | B2 | 11/2023 | Dunn et al. |
| 11,921,010 | B2 | 3/2024 | Dunn et al. |
| 11,928,380 | B2 | 3/2024 | Newnham et al. |
| 11,965,804 | B2 | 4/2024 | Dunn et al. |
| 11,972,672 | B1 | 4/2024 | Dunn |
| 11,989,476 | B2 | 5/2024 | Newnham et al. |
| 2002/0019933 | A1 | 2/2002 | Friedman et al. |
| 2002/0026354 | A1 | 2/2002 | Shoji et al. |
| 2002/0065046 | A1 | 5/2002 | Mankins et al. |
| 2002/0112026 | A1 | 8/2002 | Fridman et al. |
| 2002/0120721 | A1 | 8/2002 | Eilers et al. |
| 2002/0147648 | A1 | 10/2002 | Fadden et al. |
| 2002/0152425 | A1 | 10/2002 | Chaiken et al. |
| 2002/0163513 | A1 | 11/2002 | Tsuji |
| 2002/0163916 | A1 | 11/2002 | Oskouy et al. |
| 2002/0164962 | A1 | 11/2002 | Mankins et al. |
| 2002/0190972 | A1 | 12/2002 | Ven de Van |
| 2002/0194365 | A1 | 12/2002 | Jammes |
| 2002/0194609 | A1 | 12/2002 | Tran |
| 2003/0031128 | A1 | 2/2003 | Kim et al. |
| 2003/0039312 | A1 | 2/2003 | Horowitz et al. |
| 2003/0061316 | A1 | 3/2003 | Blair et al. |
| 2003/0097497 | A1 | 5/2003 | Esakov |
| 2003/0098881 | A1 | 5/2003 | Nolte et al. |
| 2003/0115591 | A1 | 6/2003 | Weissmueller, Jr. et al. |
| 2003/0117714 | A1 | 6/2003 | Nakamura et al. |
| 2003/0132514 | A1 | 7/2003 | Liebeskind |
| 2003/0161354 | A1 | 8/2003 | Bader et al. |
| 2003/0177269 | A1 | 9/2003 | Robinson et al. |
| 2003/0192060 | A1 | 10/2003 | Levy |
| 2003/0196208 | A1 | 10/2003 | Jacobson |
| 2003/0214242 | A1 | 11/2003 | Berg-johansen |
| 2003/0230991 | A1 | 12/2003 | Muthu et al. |
| 2004/0036697 | A1 | 2/2004 | Kim et al. |
| 2004/0138840 | A1 | 7/2004 | Wolfe |
| 2004/0158872 | A1 | 8/2004 | Kobayashi |
| 2004/0194131 | A1 | 9/2004 | Ellis et al. |
| 2004/0210419 | A1 | 10/2004 | Wiebe et al. |
| 2004/0243940 | A1 | 12/2004 | Lee et al. |
| 2004/0252400 | A1 | 12/2004 | Blank et al. |
| 2004/0253947 | A1 | 12/2004 | Phillips et al. |
| 2005/0033840 | A1 | 2/2005 | Nisani et al. |
| 2005/0070335 | A1 | 3/2005 | Jitsuishi et al. |
| 2005/0071252 | A1 | 3/2005 | Henning et al. |
| 2005/0073518 | A1 | 4/2005 | Bontempi |
| 2005/0088984 | A1 | 4/2005 | Chin et al. |
| 2005/0123001 | A1 | 6/2005 | Craven et al. |
| 2005/0132036 | A1 | 6/2005 | Jang et al. |
| 2005/0179554 | A1 | 8/2005 | Lu |
| 2005/0184983 | A1 | 8/2005 | Brabander et al. |
| 2005/0216939 | A1 | 9/2005 | Corbin |
| 2005/0231457 | A1 | 10/2005 | Yamamoto et al. |
| 2005/0267943 | A1 | 12/2005 | Castaldi et al. |
| 2005/0289061 | A1 | 12/2005 | Kulakowski et al. |

(56) References Cited

U.S. PATENT DOCUMENTS

2005/0289588 A1 12/2005 Kinnear
2006/0007107 A1 1/2006 Ferguson
2006/0022616 A1 2/2006 Furukawa et al.
2006/0150222 A1 7/2006 McCafferty et al.
2006/0160614 A1 7/2006 Walker et al.
2006/0269216 A1 11/2006 Wiemeyer et al.
2007/0039028 A1 2/2007 Bar
2007/0154060 A1 7/2007 Sun
2007/0157260 A1 7/2007 Walker
2007/0168539 A1 7/2007 Day
2007/0200513 A1 8/2007 Ha et al.
2007/0214812 A1 9/2007 Wagner et al.
2007/0237636 A1 10/2007 Hsu
2007/0268241 A1 11/2007 Nitta et al.
2007/0273519 A1 11/2007 Ichikawa et al.
2007/0274400 A1 11/2007 Murai et al.
2007/0286107 A1 12/2007 Singh et al.
2007/0291198 A1 12/2007 Shen
2008/0008471 A1 1/2008 Dress
2008/0019147 A1 1/2008 Erchak et al.
2008/0024268 A1 1/2008 Wong et al.
2008/0034205 A1 2/2008 Alain et al.
2008/0037466 A1 2/2008 Ngo et al.
2008/0037783 A1 2/2008 Kim et al.
2008/0055297 A1 3/2008 Park
2008/0096559 A1 4/2008 Phillips et al.
2008/0104631 A1 5/2008 Krock et al.
2008/0111958 A1 5/2008 Kleverman et al.
2008/0112601 A1 5/2008 Warp
2008/0136770 A1 6/2008 Peker et al.
2008/0163291 A1 7/2008 Fishman et al.
2008/0185976 A1 8/2008 Dickey et al.
2008/0218501 A1 9/2008 Diamond
2008/0246871 A1 10/2008 Kupper et al.
2008/0266554 A1 10/2008 Sekine et al.
2008/0267328 A1 10/2008 Ianni et al.
2008/0278099 A1 11/2008 Bergfors et al.
2008/0281165 A1 11/2008 Rai et al.
2008/0303918 A1 12/2008 Keithley
2008/0313691 A1 12/2008 Cholas et al.
2009/0009997 A1 1/2009 Sanfilippo et al.
2009/0015400 A1 1/2009 Breed
2009/0034283 A1 2/2009 Albright et al.
2009/0036190 A1 2/2009 Brosnan et al.
2009/0079416 A1 3/2009 Vinden et al.
2009/0104989 A1 4/2009 Williams et al.
2009/0129556 A1 5/2009 Ahn
2009/0140858 A1 6/2009 Gore et al.
2009/0152445 A1 6/2009 Gardner, Jr.
2009/0164615 A1 6/2009 Akkanen
2009/0273568 A1 11/2009 Milner
2009/0315867 A1 12/2009 Sakamoto et al.
2010/0017526 A1 1/2010 Jagannath et al.
2010/0037274 A1 2/2010 Meuninck et al.
2010/0060550 A1 3/2010 McGinn et al.
2010/0083305 A1 4/2010 Acharya et al.
2010/0149567 A1 6/2010 Kanazawa et al.
2010/0177157 A1 7/2010 Stephens et al.
2010/0177158 A1 7/2010 Walter
2010/0177750 A1 7/2010 Essinger et al.
2010/0198983 A1 8/2010 Monroe et al.
2010/0226091 A1 9/2010 Dunn
2010/0231563 A1 9/2010 Dunn et al.
2010/0237697 A1 9/2010 Dunn et al.
2010/0238299 A1 9/2010 Dunn et al.
2010/0299556 A1 11/2010 Taylor et al.
2011/0019636 A1 1/2011 Fukuoka et al.
2011/0047567 A1 2/2011 Zigmond et al.
2011/0078536 A1 3/2011 Han et al.
2011/0283199 A1 11/2011 Schuch et al.
2012/0105424 A1 5/2012 Lee et al.
2012/0203872 A1 8/2012 Luby et al.
2012/0302343 A1 11/2012 Hurst et al.
2012/0308191 A1 12/2012 Chung et al.
2013/0007110 A1 1/2013 Centner
2013/0162908 A1 6/2013 Son et al.
2013/0173358 A1 7/2013 Pinkus
2013/0282154 A1 10/2013 Chappell et al.
2014/0002747 A1 1/2014 Macholz
2014/0009893 A1 1/2014 Lai
2014/0172174 A1 6/2014 Poss et al.
2014/0230526 A1 8/2014 Willemin et al.
2015/0169827 A1 6/2015 LaBorde
2015/0193074 A1 7/2015 Cudak et al.
2015/0250021 A1 9/2015 Stice et al.
2016/0034240 A1 2/2016 Kreiner et al.
2016/0112521 A1 4/2016 Lawson et al.
2016/0125468 A1 5/2016 Staneluis et al.
2016/0125772 A1 5/2016 Li et al.
2016/0292744 A1 10/2016 Strimaitis et al.
2017/0075777 A1 3/2017 Dunn et al.
2017/0083043 A1 3/2017 Bowers et al.
2017/0091822 A1 3/2017 Tian et al.
2017/0163519 A1 6/2017 Bowers et al.
2017/0242502 A1 8/2017 Gray et al.
2017/0242534 A1 8/2017 Gray
2017/0256051 A1 9/2017 Dwivedi et al.
2017/0315886 A1 11/2017 Helmick et al.
2018/0027635 A1 1/2018 Roquemore, III
2018/0061297 A1 3/2018 Schuch et al.
2018/0089717 A1 3/2018 Morin et al.
2018/0128708 A1 5/2018 Cirino
2018/0181091 A1 6/2018 Funk et al.
2018/0268783 A1 9/2018 Woo
2018/0284758 A1 10/2018 Cella et al.
2018/0314103 A1 11/2018 Dunn et al.
2018/0364858 A1 12/2018 Gray
2018/0364859 A1 12/2018 Gray
2018/0364860 A1 12/2018 Gray
2018/0364861 A1 12/2018 Gray
2019/0087042 A1 3/2019 Van Ostrand et al.
2019/0096202 A1 3/2019 Seelman
2019/0171331 A1 6/2019 Gray et al.
2019/0258552 A1 8/2019 Dunn et al.
2019/0367148 A1 12/2019 Kehlenbeck et al.
2020/0012383 A1 1/2020 Wang et al.
2020/0019363 A1 1/2020 Newnham et al.
2020/0272269 A1 8/2020 Dunn
2021/0018210 A1* 1/2021 Nasis ........................ F24F 11/65
2021/0117143 A1 4/2021 Newnham et al.
2021/0174715 A1 6/2021 Holloway et al.
2021/0397292 A1 12/2021 Dunn
2022/0100452 A1 3/2022 Newnham et al.
2022/0260872 A1 8/2022 Dunn et al.
2022/0317801 A1 10/2022 Dunn
2022/0413786 A1 12/2022 Newnham et al.
2023/0029615 A1 2/2023 Dunn et al.
2023/0048815 A1 2/2023 Newnham et al.
2023/0052966 A1 2/2023 Newnham et al.
2023/0160774 A1 5/2023 Dunn et al.
2023/0195399 A1 6/2023 Newnham et al.
2023/0229253 A1 7/2023 Dunn
2023/0229373 A1 7/2023 Newnham et al.
2024/0144806 A1 5/2024 Dunn
2024/0201040 A1 6/2024 Dunn et al.
2024/0242590 A1 7/2024 Dunn
2024/0256203 A1 8/2024 Newnham et al.

FOREIGN PATENT DOCUMENTS

CN 217384567 U 9/2022
EP 0313331 B1 2/1994
EP 1821538 A1 8/2007
EP 2351369 A2 8/2011
EP 2396964 A2 12/2011
EP 3347793 A1 7/2018
JP 61-234690 A 10/1986
JP 61-251901 A 11/1986
JP 7-74224 A 3/1995
JP 2000122575 A 4/2000
JP 3080628 B2 8/2000
JP 2002064842 A 2/2002
JP 2002209230 A 7/2002
JP 2005-211449 A 8/2005

(56) References Cited

FOREIGN PATENT DOCUMENTS

| | | | |
|---|---|---|---|
| JP | 2005-211451 | A | 8/2005 |
| JP | 2005236469 | A | 9/2005 |
| JP | 2005333568 | A | 12/2005 |
| JP | 4235429 | B2 | 3/2009 |
| JP | 2010282109 | A | 12/2010 |
| JP | 2018537876 | A | 12/2018 |
| JP | 6639653 | B2 | 1/2020 |
| KR | 200361111 | Y1 | 9/2004 |
| KR | 10-2010-0081354 | A | 7/2010 |
| KR | 10-2011-0065338 | A | 6/2011 |
| KR | 10-2056069 | B1 | 12/2019 |
| WO | WO9608892 | A1 | 3/1996 |
| WO | WO2008050402 | A1 | 5/2008 |
| WO | WO2011106683 | A2 | 9/2011 |
| WO | WO2012/127971 | A1 | 9/2012 |
| WO | WO2013/182733 | A1 | 12/2013 |
| WO | WO2017044952 | A1 | 3/2017 |
| WO | WO2020/176416 | A1 | 9/2020 |
| WO | WO2023/009477 | A1 | 2/2023 |

OTHER PUBLICATIONS

Methven, Don, Wireless Video Streaming: An Overview, Nov. 16, 2022, 7 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink Website User Manual, http://smartlink.outdoorlinkinc.com/docs/SmartLinkWebsiteUserManual.pdf, 2017, 33 pages.
Outdoorlink, Inc., SmartLink One Out of Home Media Controller, 2016, 1 page.
Sigmasense, Analog can't touch Digital, https://sigmasense.com/, retrieved Jan. 23, 2019, 5 pages.
Sigmasense, Solutions, https://sigmasense.com/solutions/, retrieved Jan. 23, 2019, 4 pages.
Sigmasense, Technology, https://sigmasense.com/technology/, retrieved Jan. 23, 2019, 3 pages.
Turley, Jim, SigmaSence ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

* cited by examiner

SYSTEMS AND METHODS FOR IDENTIFYING POORLY SEALED ELECTRONIC DISPLAY ASSEMBLIES, ELECTRONIC DISPLAY ASSEMBLIES IMPLEMENTING THE SAME

CROSS-REFERENCE TO RELATED APPLICATIONS

This application claims the benefit of U.S. Provisional Application Ser. No. 63/614,221 filed Dec. 22, 2023, the disclosures of which are hereby incorporated by reference as if fully restated herein.

TECHNICAL FIELD

Exemplary embodiments relate generally to systems and methods for identifying poorly sealed electronic display assemblies, and electronic display assemblies implementing the same.

BACKGROUND AND SUMMARY OF THE INVENTION

Digital out of home (DOOH) advertising is becoming increasingly popular. To provide such DOOH advertising, electronic displays are sometimes placed within ruggedized enclosures, such as to protect the sensitive electronics of such units from the elements. A variety of such electronic equipment may be provided at or within such enclosures (e.g., touch screens, communications equipment, cameras, microchips and other electronic circuitry, power supplies, computing equipment, sensors, fans, climate control equipment, combinations thereof, or the like). A variety of electronic display assemblies (hereinafter also "units") for DOOH advertising and other purposes are known, including the BOLDVU® units from Manufacturing Resources International, Inc. of Alpharetta, Georgia (mri-inc.net).

Sometimes, for a variety of reasons, such units have leaks. Examples of reasons for such leaks include door or access panels left open or unlatched, degrading seals, imperfect manufacturing, combinations thereof, or the like. These leaks can result in inefficient performance or damage to the unit, such as but not limited to, from introduction of contaminants to the units, lack of adequate climate control, combinations thereof, or the like.

It is known to remotely monitor such units for various parameters. Examples of such remote monitoring include SMARTVU® services and features from Manufacturing Resources International, Inc. Generally, remote monitoring may involve setting acceptable operating parameters and generating alerts when those parameters are not met. However, remotely monitoring for leaky units is difficult in part because the units experience a wide variety of conditions, such as from varying ambient conditions (e.g., hot and cold temperatures) and varying operating conditions (e.g., fan speed), which may provide a wide variety of acceptable parameters. For example, internal pressures of such units may vary significantly during normal operations, such as internal temperatures rise and fall. Thus, aside from potentially extreme leaks, there is generally no "one size fits all" parameter to alerting to leaky units. Stated another way, what might be an acceptable parameter under certain conditions might not be acceptable under others.

This is further complicated by the relatively sensitive nature of the measurements and relatively high noise levels of such data. For example, a relatively small pressure change might need to be detected to find a relatively small leak in a unit. However, sensor data may be disturbed by other influences such as changing fan speed, ambient wind, changing temperatures, combinations thereof, and the like.

Further still, the level of sealing may fluctuate based on conditions, such as due to thermal expansion and contraction.

Because of this, while traditional monitoring and alerting may be used to spot more catastrophic failures, accurately identifying poorly sealed units typically requires manual review of data and/or physical inspection, along with detailed expert knowledge, and often testing/validation-all of which are resource intensive efforts that are not always available. Therefore, what is needed is automated review of unit data to accurately identify poorly sealed electronic display assemblies.

Systems and methods providing automated, accurate identification of electronic display assemblies (hereinafter also "units") that are relatively poorly and/or unacceptably sealed (hereinafter also "leaky" or "likely leaking") are disclosed, along with electronic display assemblies implementing the same. In exemplary embodiments, without limitation, one or more neural network models may be provided for identifying these likely leaking units. The neural network model may be trained, preferably using data from real units, in a supervised learning fashion. Test data may be used to identify an acceptably accurate model or ensemble of models to be used.

In exemplary embodiments, without limitation, the data for training and use may comprise temperature and pressure samples taken from within a closed loop airflow of the unit. The data may be derived from sampling pressure and temperature data on a regular basis during specified window(s) of time. Preferably, such sampling occurs every minute during hours when a display backlight (or other illumination source) is increasing in power (e.g., 4 am to 10 am, sunrise) and/or decreasing in power (e.g., 4 pm to 10 pm, sunset).

The neural network may utilize, for example without limitation, one or more activation functions such as, but not limited to, rectified linear unit function, sigmoid equation, and/or hyperbolic tangent functions, training/loss function(s), such as but not limited to binary cross-entropy equation(s), combinations thereof, or the like.

Optionally, an algorithm may analyze the pressure and temperature data to identify if/when an inversion in temperature rate change and pressure rate change occurs. The algorithm may be executed in parallel or separately, but preferably on the same or substantially (e.g., 80% or more) the same data. In exemplary embodiments, without limitation, agreement between the neural network model and the algorithm model must be reached that a unit is leaky before an alert is generated and/or transmitted, and/or a separate, confirmation notification is generated and/or transmitted.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
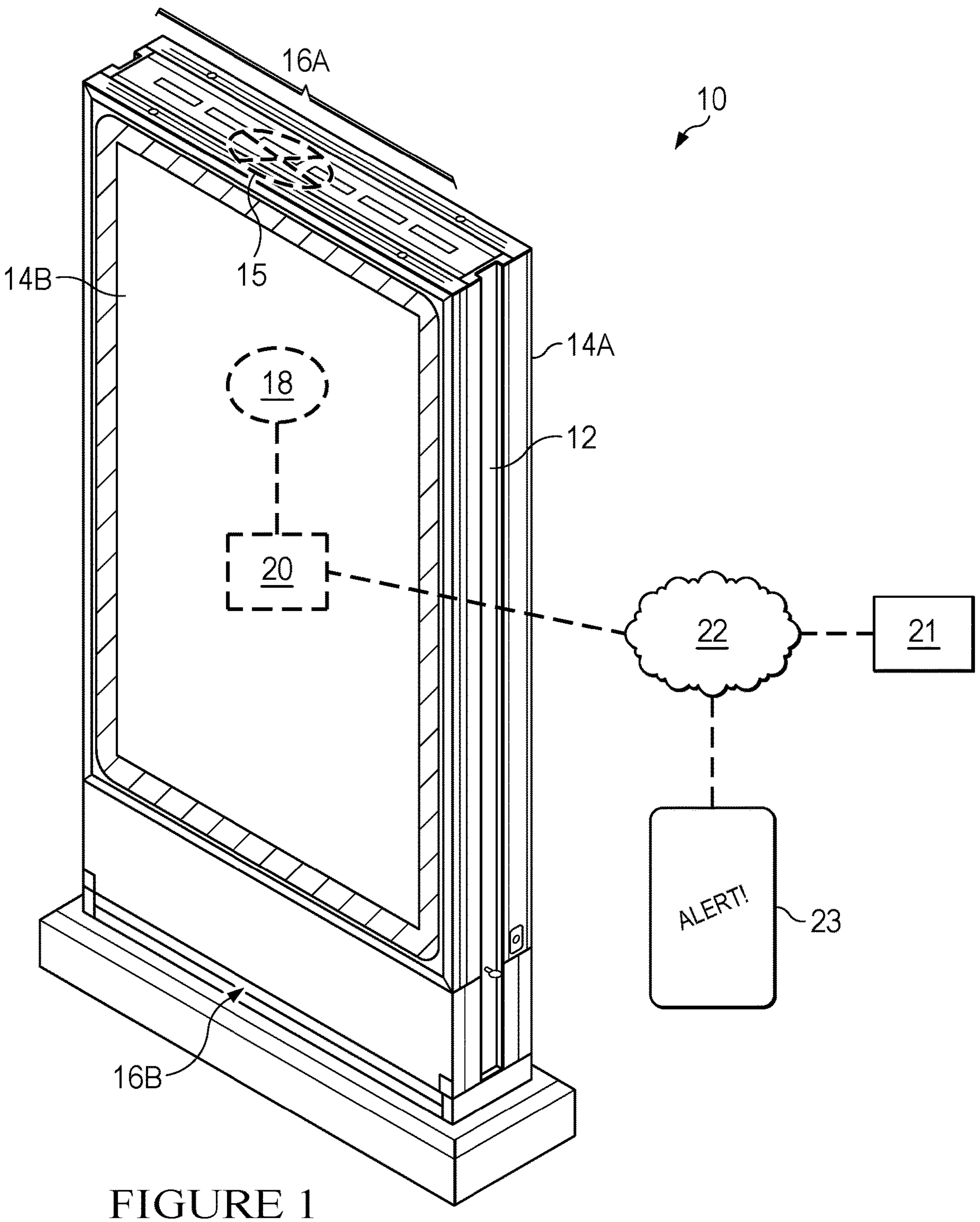
FIG. 1 is an exemplary display unit.

FIG. 1 illustrates an exemplary display unit 10. The unit 10 may comprise a first side assembly 14A and a second side assembly 14B connected to a structural framework 12. The first and second side assemblies 14A, 14B may be mounted to opposing sides of the framework 12. The framework 12 may include one or more structural members, panels, combinations thereof, or the like. The framework 12 may be configured for mounting to a ground surface (e.g., sidewalk, parking lot, etc.), street furniture (e.g., bus shelter, railing, pole, etc.), combinations thereof, or the like, and/or may incorporate the same. Any number and/or arrangement of the side assemblies 14 may be utilized along with any size and/or shape framework 12.

Each side assembly 14 comprises an electronic display in exemplary embodiments, although such is not necessarily required. For example, one or more of the side assemblies may include a poster cavity (illuminated or otherwise), door/access panel, combinations thereof, or the like in other exemplary embodiments, while preferably including similar structure (e.g., panels) to provide the associated airflow pathway(s) shown and/or described herein. Where electronic displays are utilized, such electronic displays may be of any type (e.g., LCD, OLED, plasma, etc.).

In exemplary embodiments, without limitation, the side assemblies 14 are movably mounted to the framework 12, such as by way of hinges located along an upper portion or side of the side assemblies 14 to allow rotation about a substantially (e.g., within 20 degrees) horizontal or vertical axis, gas struts, single or multi-arm linkages, combinations thereof, or the like. This may permit servicing of the unit 10, such as internal components and/or side assemblies 14, including on site servicing, interchange and/or replacement. Electronic equipment and/or other components may be located at or between the side assemblies 14, such as microchips, computing equipment, sensors 18, fans 15, servers, network connectivity equipment, power supplies, wiring, electronic circuitry, combinations thereof, or the like.

One or more airflow pathways and/or chambers may be provided at the units 10 and/or side assemblies 14. Intakes and/or exhausts 16 may be provided at the framework 12 and/or the side assemblies 14 for ingesting and/or exhausting ambient air. For example, without limitation, a common or separate intake(s) 16A may be provided at an upper portion of the framework 12 for the side assemblies 14 and/or heat exchanger while separate, dedicated exhausts 16B are provided at a lower portion of each side assembly 14 and/or the heat exchanger. Various common and/or separate intakes and/or exhausts 16 may be utilized for one or more of the side assemblies 14 and/or heat exchanger. The number and/or arrangement of intakes/exhausts 16 is exemplary and not intended to be limiting. Internal intakes/exhausts may be provided for moving air into and/or out of each of the side assemblies 14. The intakes and/or exhausts 16 may ingest and/or exhaust ambient air through one or more open loop airflow pathways within the unit 10. The units 10 may include one or more closed loop airflow pathways. The units 10 may include, for example without limitation, some or all of the components, airflow pathways, operating modes, combinations thereof, or the like shown and/or described in one or more of U.S. Pat. Nos. 8,767,165, 8,654,302, 11,822,171, 11,762,231, US Pub. No. 2023/0029615, and US Pub. No. 2023/0160774, the disclosures of each of which are hereby incorporated by reference as if fully restated herein. For example, without limitation, one or more fans 15 may be located internal to the units 10. The fans 15 may be located at intakes and/or exhausts 16, along open loop airflow pathway(s), and/or along closed loop airflow pathway(s) for moving ambient air through the one or more open loop airflow pathway(s) and/or circulating gas through the one or more closed loop airflow pathway(s).

As used herein, closed loop airflow pathway(s) may refer to airflow pathways and/or chambers which are provided internal to the unit 10, such as separated from the ambient environment and/or any open loop airflow pathways on the unit 10 in accordance with ingress protection code IP65 or more well sealed (e.g., higher rating) as set forth by the International Electrotechnical Commission of Geneva, Switzerland (https://www.iec.ch/ip-ratings).

Data may be received from one or more sensors 18 located at or within the units 10. The sensor(s) 18 may include temperature sensors, pressure sensors, airspeed sensors, flow rate sensors, light sensors (ambient and/or backlight levels; commanded or actual), combinations thereof, or the like. The data from the sensor(s) 18 may be received at local controllers 20 and/or servers 21, such as by way of one or more networks 22 and/or network communication devices (e.g., routers, modems, cables, radios, antennae, combinations thereof, or the like). Data may be received from a single unit 10 or multiple units 10 of a same or different type.

Figure 2:
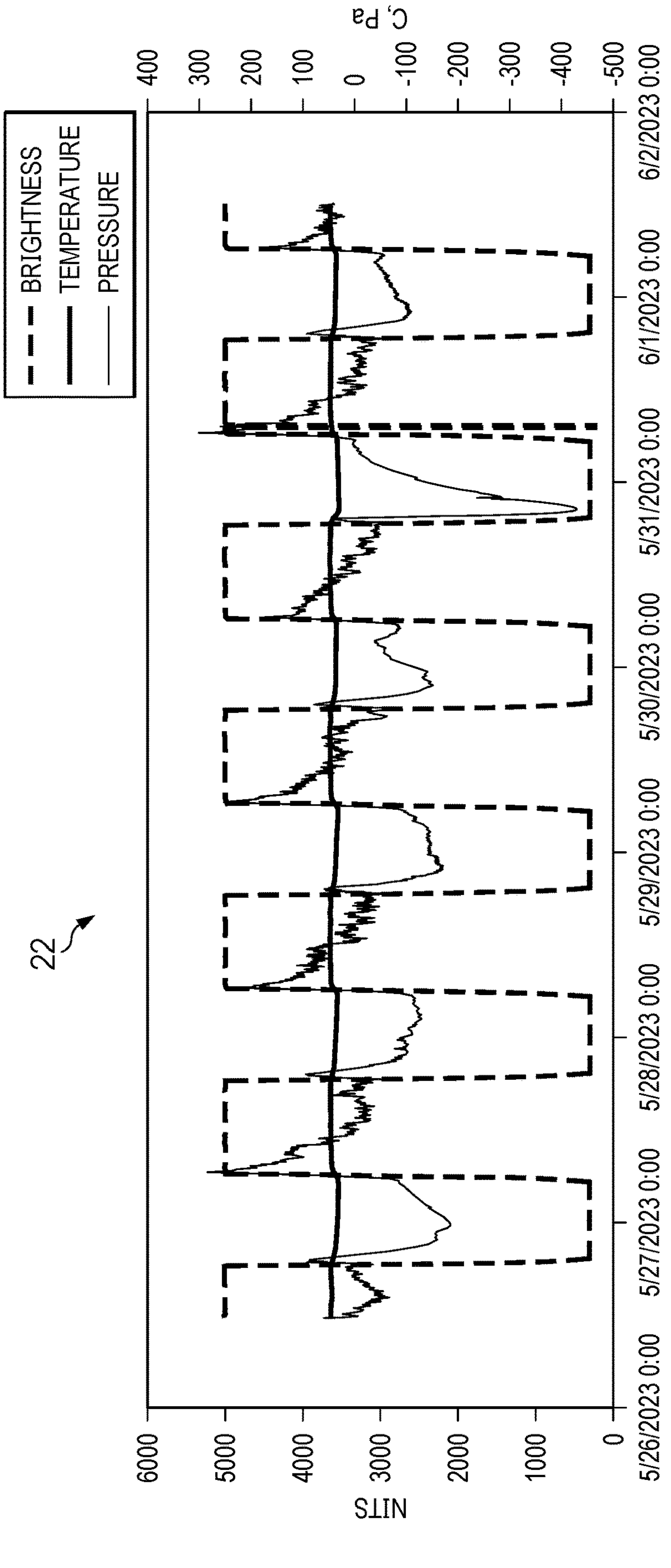
FIG. 2 is an exemplary graphical depiction of exemplary pressures, temperatures, and display brightness over a multi-day period for an exemplary well sealed unit.
Figure 3:
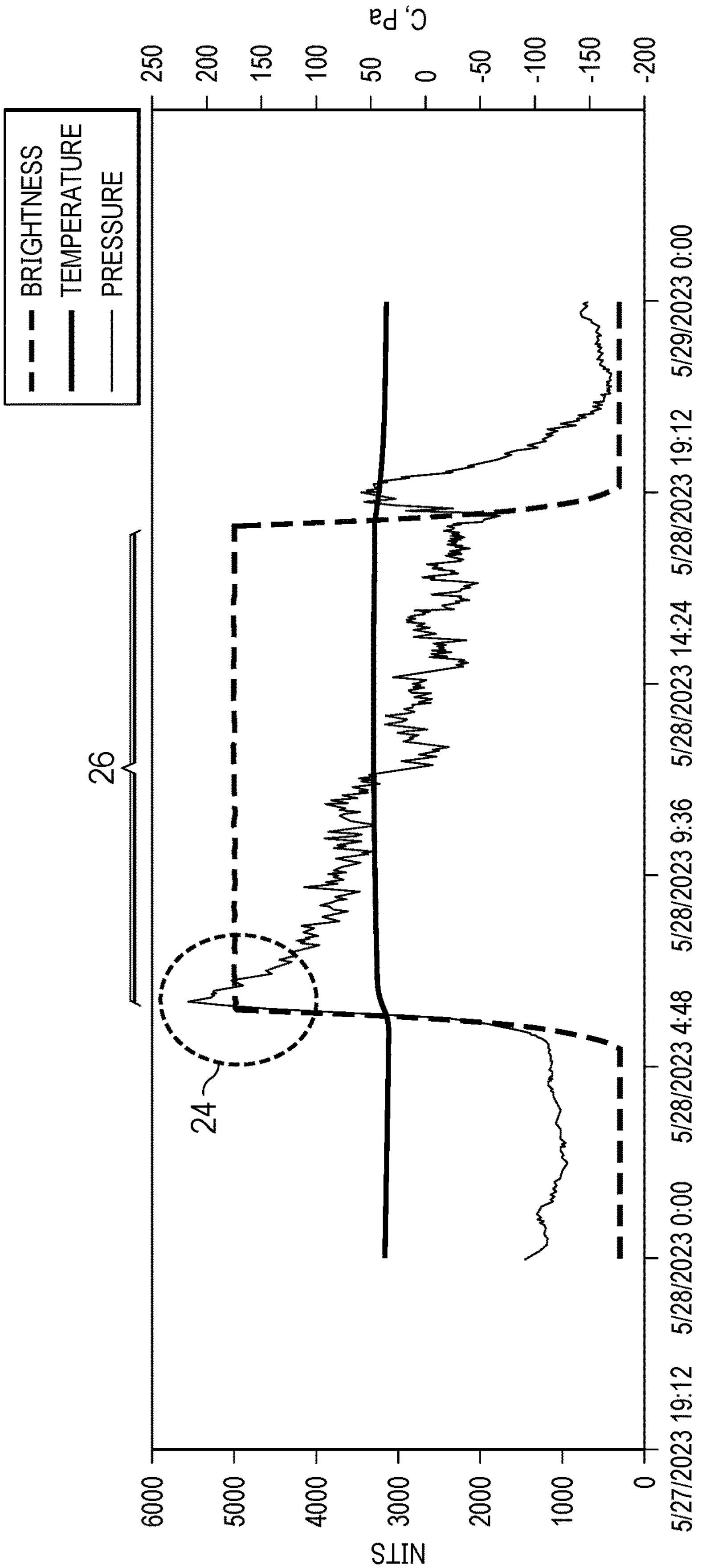
FIG. 3 is a detailed view of an exemplary approximately one day period of the graph of FIG. 2.

As illustrated with particular regard to FIG. 2 and FIG. 3, exemplary well sealed units may experience a pressure spike, indicated generally at item 24 of FIG. 3, with rising display illumination levels. In exemplary embodiments, without limitation, the temperature and pressure data is derived from one or more sensor(s) 18 located along one or more closed loop airflow pathway within the unit(s) 10. For example, the increase in illumination levels may generate heat, which causes temperature rise and air within the units 10, such as within the closed loop airflow pathway(s), to expand. The increases in temperature and pressure may be proportional with the rise of brightness level. Relatively well sealed units may incur a pressure increase with this expanded air. Since the units 10 are not perfectly sealed, the units 10 may leak down over time, resulting in a gradual pressure drop, such as eventually back to pre-spike levels. Stated another way, the unit 10 may remain at essentially non-equilibrium pressure conditions (relative to ambient) for a relatively long period of time where it is relatively well-sealed.

Notably, the pressure of the spike 24 may be, mostly, if not primarily (e.g., at least 80%) due to the relationship of temperature and pressure under the ideal gas law. However, that law may not apply perfectly due to, for example, flexibility in the paneling, gaskets, and/or other structures within the unit 10 separating the closed loop from ambient air (e.g., in the open loop and/or ambient environment). Thus, the neural network model may be particularly well suited for detecting such relationships. Furthermore, a relatively large spike 24 (i.e., strong correlation) and/or maintenance of elevated pressure levels for a relatively long period of time 26 (i.e., long leak down time) may identify a relatively well sealed unit 10, while a relatively smaller spike 24 (i.e., weaker correlation) and/or maintenance of elevated pressure levels for a relatively short period of time 26 (i.e., short leak down time) may identify a relatively less well sealed unit 10, a leaky unit 10, an especially leaky unit 10, or the like. The neural network model or otherwise may be configured to categorize units 10 based on the same. For example, the neural network model or otherwise may be configured to group units 10 and/or arrange the units 10 into a hierarchy based on the sealing levels.

Figure 4:
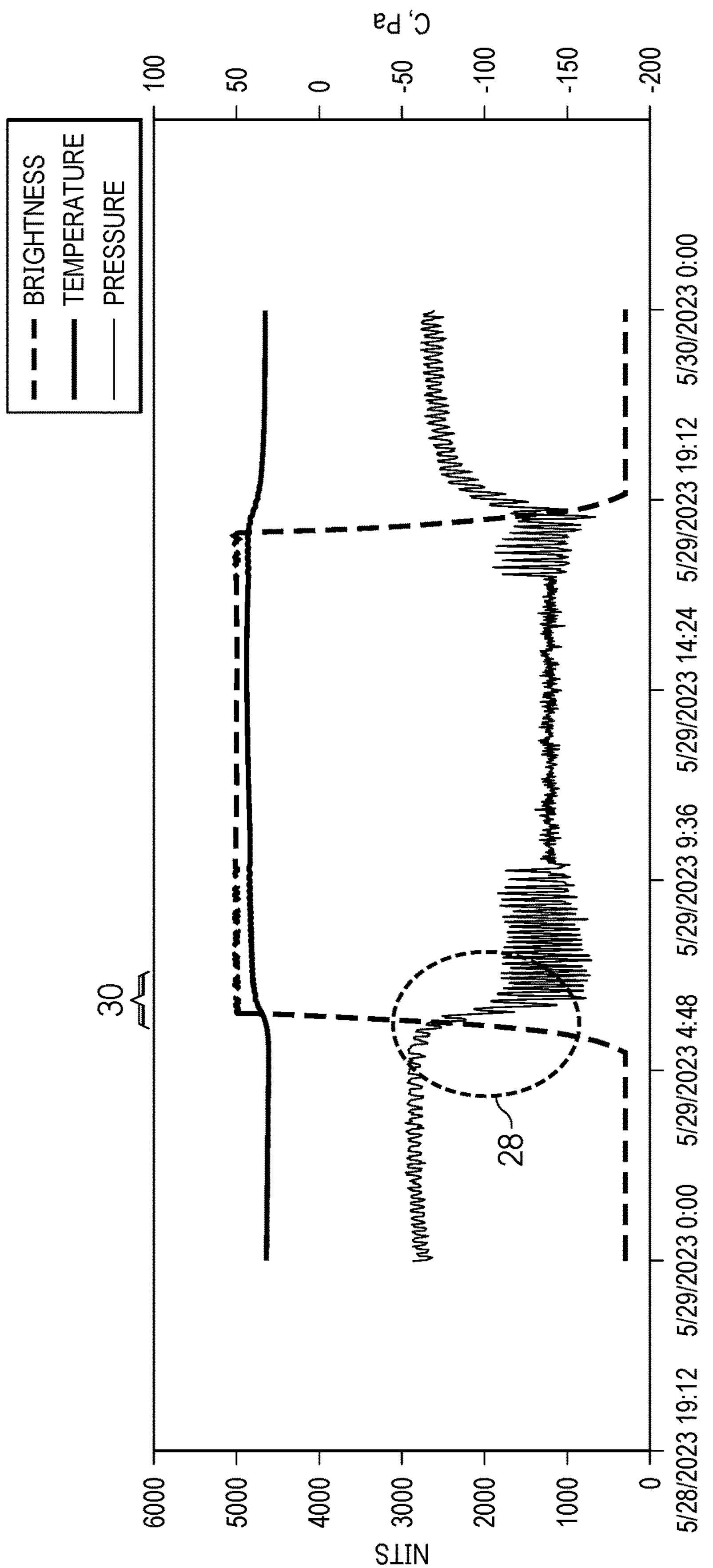
FIG. 4 is an exemplary graphical depiction of exemplary pressures, temperatures, and display brightness over an exemplary approximately one day period for an exemplary leaky unit.

As illustrated with particular regard to FIG. 4, an exemplary leaky unit 10 may see little pressure increase, or a pressure decrease, with rising illumination levels. Generally speaking, as brightness and/or temperature increases, fans 15 within the units 10 are activated or increased in speed, such as to bring in relatively cool ambient air and/or circulate air within the units 10. A small increase, or decrease, (illustrated generally at item 28) in pressure may be detected, such as depending on whether the sensor 18 is located on a relatively high or low pressure side of the fan 15, as the fan(s) 15 are turned on or their speed is increased. In this way, pressure may rise more slowly than temperature compared to a well-sealed unit 10 or may show an inverse relationship. Regardless, little response and/or a relatively rapid transition 30 to an approximately equilibrium level may be recorded. Stated another way, the unit 10 may move relatively quickly to essentially equilibrium pressure conditions (relative to ambient).

While display brightness/illumination levels are sometimes shown and/or discussed herein, the same or similar conditions may be experienced and/or monitored with regard to other sources of increased air pressure, such as rapidly shutting a door or other access panel, increasing fan speed, temperature increases, combinations thereof, or the like.

Figure 5:
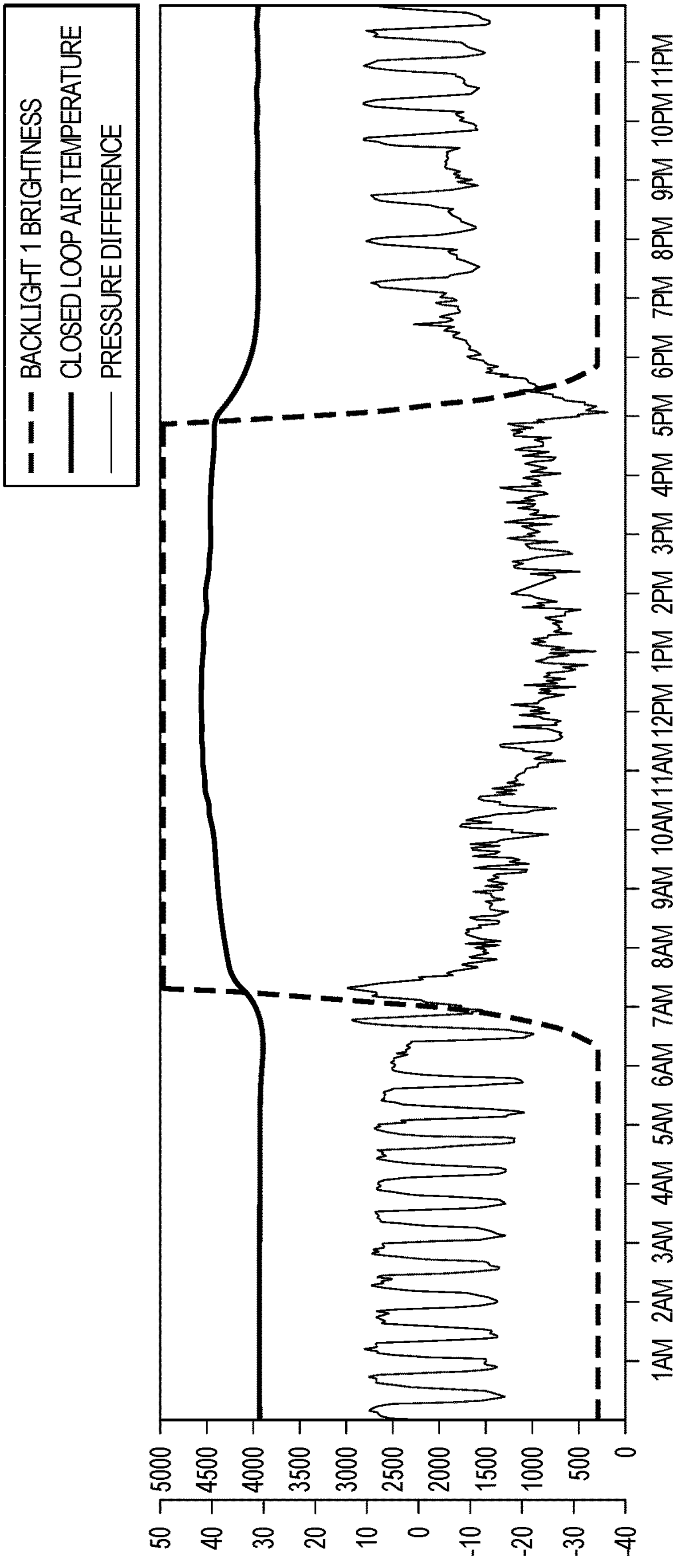
FIG. 5 is another exemplary graphical depiction of exemplary pressures, temperatures, and display brightness over an exemplary approximately one day period for an exemplary leaky unit.

However, as illustrated with particular regard to FIG. 5, units 10 with relatively low-pressure ranges may provide relatively inconsistent readings. In such situations, it may be difficult to determine for certain if the unit 10 is leaky or well-sealed. Alternatively, or additionally, different units 10 may experience a wide variety of ambient and/or internal operating conditions, making accurately identifying leaky units difficult. This is particularly true given the relatively low-pressure differential experienced, which may be on the order of 10 pascals, in exemplary embodiments, without limitation.

Figure 6:
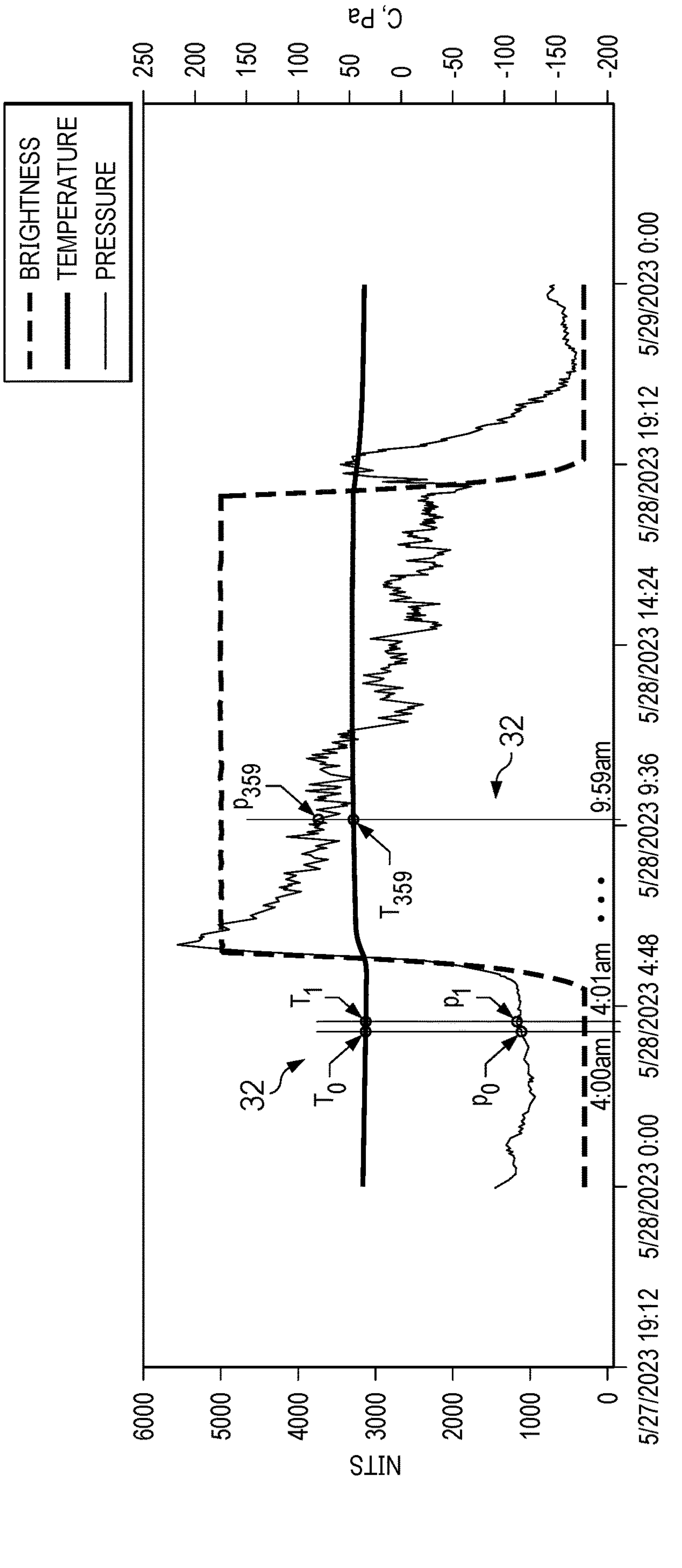
FIG. 6 is the exemplary graphical depiction of FIG. 3 with exemplary input vectors for an exemplary neural network for identifying leaky units.

FIG. 6 illustrates, in graphical form, exemplary input vectors 32 for data retrieved from the units 10. Any number and/or location of vectors 32 may be utilized—the vectors 32 being representative, any corresponding data points may be utilized. The input vectors 32 may be used to extract data points, such as temperature and pressure data points, for use with the methods shown and/or described herein, such as the neural network model. Preferably, the input vectors 32 capture data sampled at regular intervals between certain time periods. In exemplary embodiments, without limitation, the input vectors 32 capture data sampled every minute between 4 am and 10 am local time for the unit 10. In this fashion, the input vectors 32 (and/or associated data points) capture daily brightness transitions from relatively low or zero illumination levels (nits) to relatively high illumination levels (nits) as display brightness is increased to make displayed images more visible, particularly in competition with rising ambient light levels, such as due to sunrise. As those of skill in the art will recognize, various sampling rates (e.g., every few minutes, every few seconds, etc.) and/or windows may be utilized (e.g., transition to sunset). The sample rates and/or windows may vary across time and/or units 10. An exemplary input vector is provided below:

Input Vector

Equation 1

$$\vec{x} = \begin{bmatrix} T_0 \\ p_0 \\ T_1 \\ p_1 \\ \vdots \\ T_{359} \\ p_{359} \end{bmatrix}.$$

In exemplary embodiments, without limitation, the input vectors 32 provide 360 pressure and temperature samples for a given day, for a total data size of 720 data points for a given day. As those of skill in the art will recognize, a wide variety of sample sizes may be utilized.

Figure 7:
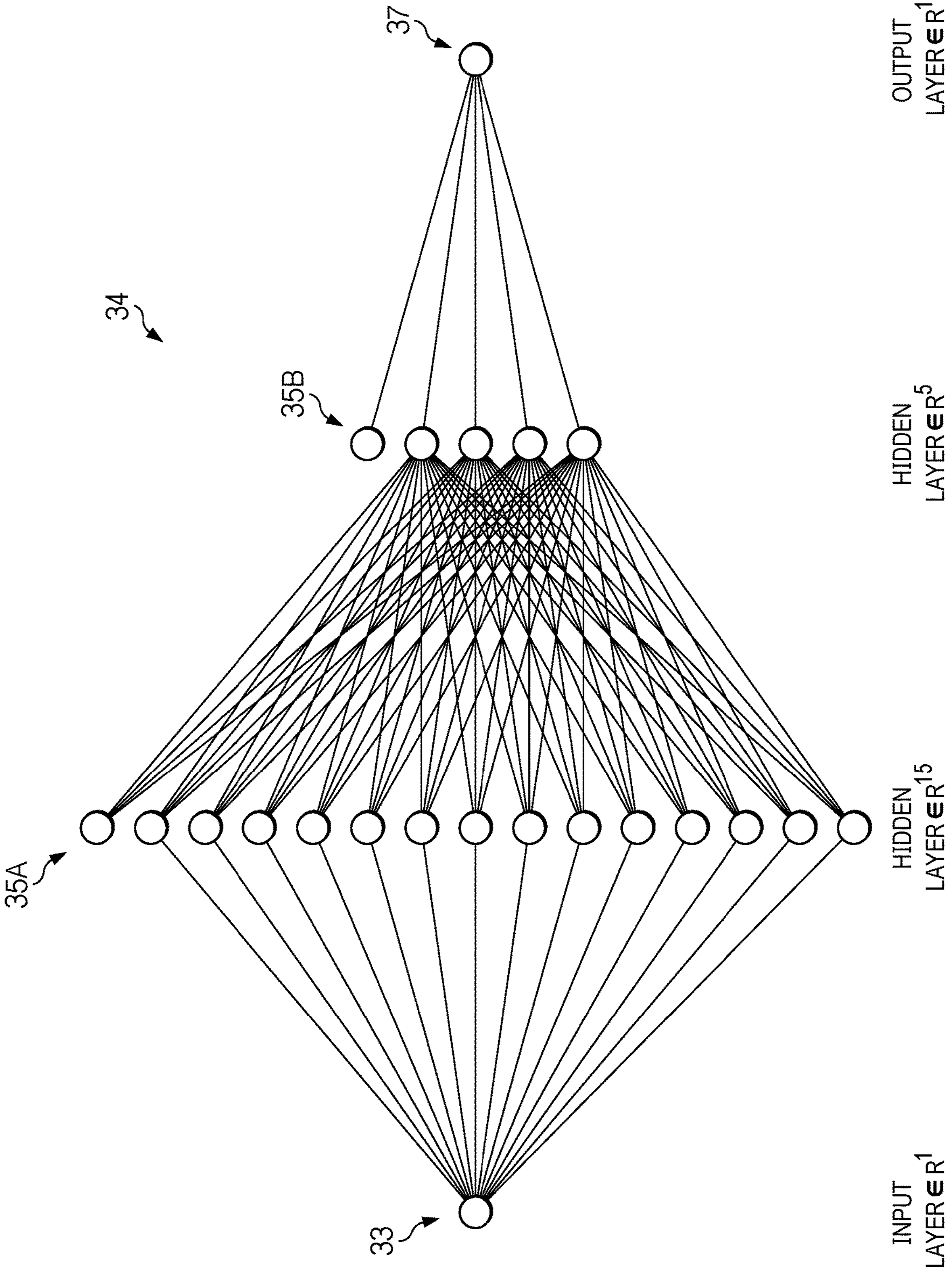
FIG. 7 is an exemplary neural network topology for identifying leaky units.

FIG. 7 illustrates an exemplary topology 34 for an exemplary neural network for identifying leaky units 10. As those of skill in the art will recognize, the size and depth of the topology 34 may vary. For example, without limitation, the neural net may be configured to be relatively shallow such as to minimize the need to consume computing resources while providing adequately accurate results. This may be, at least in part, since at least some of the processing may be occurring at microchips embedded at the units 10, such as the local controllers 20, which may not have as much computational power and/or may utilize lower computational power electronics to save on costs. In exemplary embodiments, without limitation, two hidden layers may provide adequately accurate results, though various number of layers 35A, 35B may be utilized. In exemplary embodiments, without limitation, the input vector is:

$$\vec{x} \in \mathcal{R}^{720} \qquad \text{Equation 2—Input Data}$$

Each node in the first hidden layer 35A may receive the entire input layer 33 (e.g., all data points). In exemplary embodiments, without limitation, the topology may include the input, a first hidden layer 35A with 15 nodes, a second hidden layer 35B with 5 nodes, and an output layer 37 with a single node—such as to indicate if the unit 10 is determined to be leaky or well-sealed. In exemplary embodiments, a Boolean value set to true, if a signature of a leaky unit 10 is detected, may be established {0—normal, 1—detected}. As those of skill in the art will recognize, various numbers of layers of various size may be utilized.

The hidden layers 35 may utilize a rectified linear unit (ReLU), activation function, such as provided below:

$$\text{ReLU}(x)=\max(0,x) \qquad \text{Equation 3—ReLU Equation}$$

The output layer 37 may use a sigmoid equation, and/or activation function, such as provided below:

Sigmoid Equation $$\sigma(z) = \frac{1}{1+e^{-z}} \qquad \text{Equation 4}$$

This may cause the output node to output a value between 0 and 1, such as to represent the probability of detection.

Alternatively, or additionally, to the sigmoid equation, a hyperbolic tangent function may also be used for output activation, such as provided below:

Hyperbolic Tangent Function $$\tanh(x) = \frac{e^x - e^{-x}}{e^x + e^{-x}} \qquad \text{Equation 5}$$

Data from a single unit 10 may be received locally, such as at a local controller 20. The data may be processed locally, such as at the local controller 20 by running the data through a neural network model and/or rate inversion algorithm as further discussed herein. Alternatively, or additionally, data may be received and/or processed remotely, such as at one or more servers 21, such as by running the data through a neural network model and/or rate inversion algorithm, for the single unit 10 or multiple units 10. Data transmission may be realized by way of one or more networks 22. In this fashion, leaky and well-sealed units 10 may be identified out of a plurality of units 10. Any data preprocessing may occur at the local units 10 and/or remotely at the server(s) 21. Irrespective of where the data is ultimately processed (locally, remotely, or some combination thereof), data may be received and/or processed in substantially real time, such as to make such determinations and/or generate alerts in substantially real time, though such is not required.

The collected data may include exported pressure differential and closed loop temperature telemetry values, such as collected by way of the local controller 20 and/or servers 21, such as by way of the network(s) 22.

Initially, at least some of the collected data may be associated with units 10 known to be leaky or well-sealed and identified as such for training the neural network. For example, without limitation, 738 normal samples and 135 leaky samples may be utilized, though a wide variety of number and/or ratio of the types of samples of leaky and/or well-sealed units 10 may be utilized. Preferably, a larger sample set may be utilized. Preferably, the samples come from geographically disbursed units 10 so as to provide more accurate results across a wide variety of ambient and/or operational conditions.

A loss function may be utilized to optimize the neural network's coefficients, such that the model makes better predictions with training. In exemplary embodiments, without limitation, a binary, cross-entropy equation, such as provided below may be used during training, such as with the Adam optimizer with a learning rate of 0.001, by way of non-limiting example.

$$-(y\log(p)+(1-y)\log(1-p) \qquad \text{Equation 6—Loss Function}$$

In exemplary embodiments, without limitation, the samples are split between 80% training and 20% to test, though other ratios may be utilized. A cross validation set may not be required due to minimal hyperparameter tuning, but is optional. The neural network's coefficients may be initially randomized without use of a pre-trained model, though such is not necessarily required. Training may include 1,000 iterations, though more or less iterations may be utilized. In this way, the neural network may be trained using supervised learning.

Figure 8:
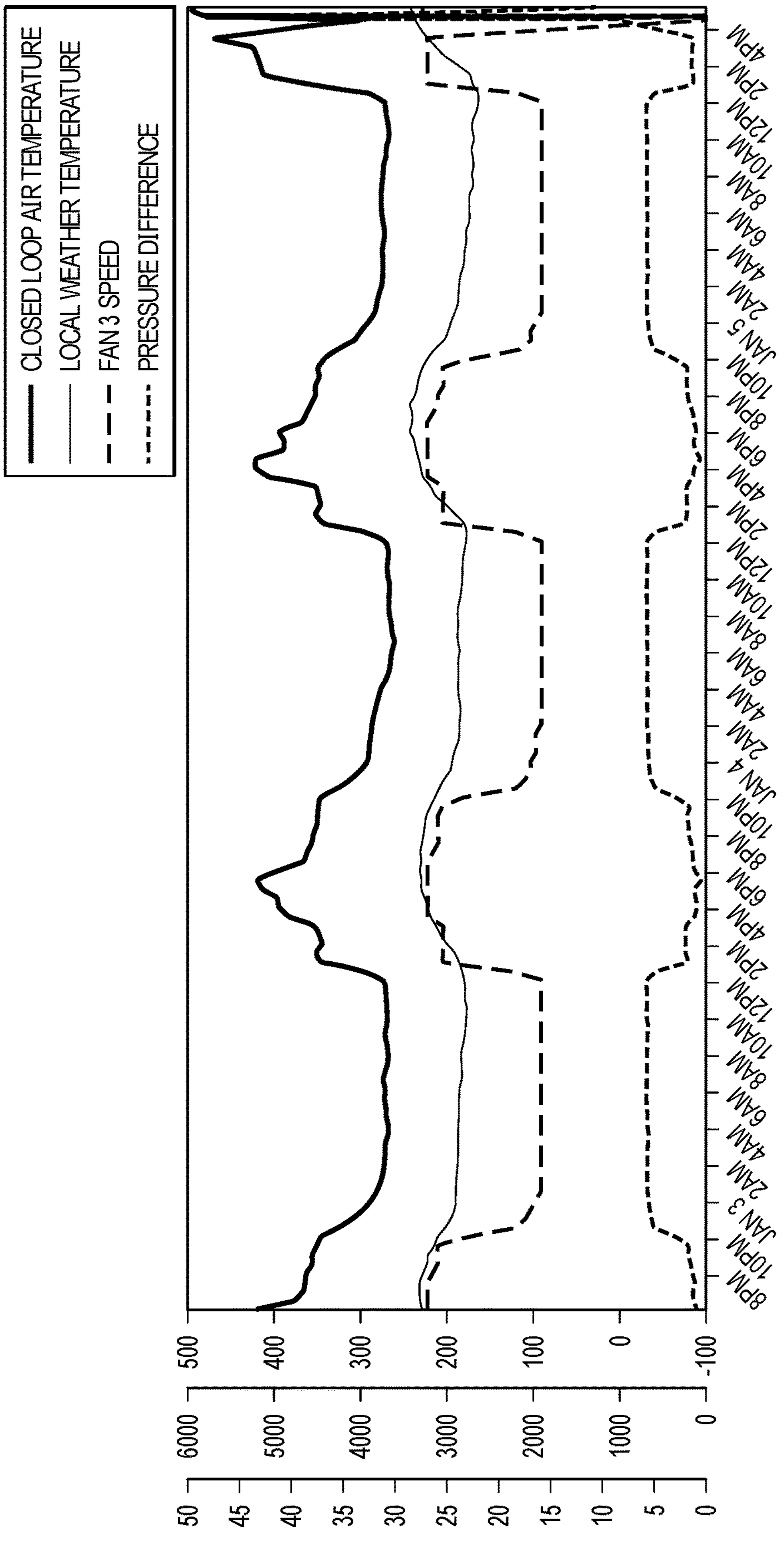
FIG. 8 is an exemplary graphical depiction of exemplary pressures, temperatures, and display brightness over an exemplary multiday period.

In exemplary embodiments, without limitation, the neural network may be configured to ignore, at least for training and/or test purposes, data having a maximum differential pressure reading within the window of under 50 pascals, though other thresholds may be utilized. Such units 10 may be too leaky or have other problems (e.g., door left open) to accurately represent leaky units 10 of the type desired to be identified. Separate alerts may optionally be generated for such units 10. In exemplary embodiments, without limitation, where the pressure consistently remains under the maximum pressure potential of the fans 15 of the unit 10, that unit 10 may be identified by the neural network model or otherwise as an especially leaky unit 10 (e.g., catastrophically failed). Essentially, this may occur where there is little to no pressure and temperature relationship under the ideal gas law, such as when a unit 10 door, side assembly 14, or the like is left open, a major hole exists, and/or a cover glass has popped out of place, by way of non-limiting example. The alert generated may indicate such a catastrophic failure and/or any one or more of the aforementioned examples. A non-limiting example of such a weak response is provided in FIG. 8.

The neural network may be developed at the servers 21 and/or other remote computing device(s), though such is not required. The neural network may be converted to a text file, such as which contains the coefficients as floating-point numbers, for implementation at the servers 21 and/or controllers 20, in exemplary embodiments, without limitation. A neural network program which is limited to carrying out forward propagation may be built in software, such as but not limited to C++, which may use one or more forward propagation algorithms to perform binary classification.

In exemplary embodiments, without limitation, on a daily basis, the servers 21 and/or controllers 20 may sample some or all units 10 within a relevant, local window of time at a respective sample rate, which may be the same or different across units 10. Preferably, pressure and temperature are sampled every minute for each unit 10 between 4 am and 10 am local time to the respective unit 10. The neural network model may be executed, such as at the controllers 20 and/or server 21, to determine a probability of each respective unit 10 leaking, which may be rounded to either zero or one. Where a value indicating a leaking unit (e.g., 1) is found, an electronic alert may be generated and transmitted, such as to one or more remote user devices 23 (e.g., smartphones, computers, tablets, combinations thereof, or the like), such as by way of the network(s) 22. The alert may comprise an electronic notification, text message, automated call, automated email, combinations thereof, or the like. Alternatively, or additionally, the error may be logged, with or without alerting.

In exemplary embodiments, without limitation, to avoid relatively costly computational resource consumption, instead of processing the entire neural network at once, a new algorithm may be created. The new algorithm may preemptively perform calculations in the first hidden layer's 35A nodes as the sensor 18 data comes in. Once the, for example 720, data points come in the remaining layers 35 may be calculated. This approach may allow the size of the first hidden layer 35A to be significantly larger than the subsequent layers 35B, etc., such as by distributing the computational effort over several hour (e.g., 6) instead of all at once. Computing time for the remaining layers 35B, etc. may be less than 2 ms, in exemplary embodiments, without limitation.

Figure 9:
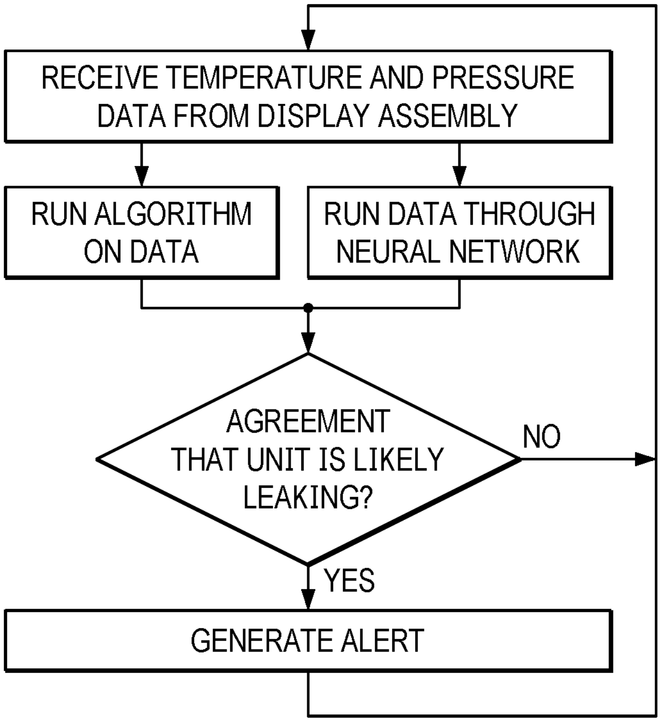
FIG. 9 is a flow chart with exemplary logic for identifying leaky units.

As illustrated in FIG. 9, in exemplary embodiments, without limitation, a rate inversion algorithm may be executed in addition to the neural network model for the data. Agreement that a given unit 10 is leaky may be required between the rate inversion algorithm and the neural network model before an electronic notification is generated and/or transmitted. This may assist with accurately identifying leaky units 10. The rate inversion algorithm confirmation is optional and may not be required in other exemplary embodiments. The rate inversion algorithm may be executed at the same time, or before, or after the neural network model.

The rate inversion algorithm may be configured to calculate rates of changes of temperature and pressure within the sample, such as but not limited to, within 10 minutes of the daily brightness ramp up of a given unit 10. The rate inversion algorithm may check for inversion between the rates. The rate inversion algorithm may be as provided below, for example without limitation:

Rate Algorithm Code — Equation 7 if brightness > $\text{brightness}_{nighttimelow}$ then

Sample $\frac{dT}{dt}$ and $\frac{dp}{dt}$ if $\frac{dT}{dt} > 0$ and $\frac{dp}{dt} < 0$ then Inversion Detected end if end if Detection by rate inversion algorithm alone may be insufficient because of sample noise, which may be due to factors including, but not necessarily limited to, ambient temperature and/or pressure changes, vibrations, ambient wind or other conditions, combinations thereof, or the like. Noise may be complicated by the relatively high level of sensitivity needed to accurately identify leaking units 10. Thus, detection by the neural network alone, or the rate inversion algorithm in combination with the neural network may lead to more accurate identification.

In exemplary embodiments, without limitation, synthetic data may be utilized, such as to increase the training test set size. Preferably, actual unit 10 data is used for test sets.

In exemplary embodiments, without limitation, the neural network may be trained to identify different types of leaks (e.g., on high or low pressure side of fan 15, other leak location, gasket seal leak, other intrusion point leaks, combinations thereof, or the like). The alerts may include an indication of the location, type, and/or kind of leak. For example, without limitation, where the pressure and temperature inversion, such as generally shown and/or described with regard to at least item 28 and FIG. 4, is detected by the neural network model or otherwise, an alert may be generated which indicates that a leak is detected in a high pressure and/or electronic display/LCD region. As a further example, without limitation, where the pressure and temperature is relatively flat or otherwise relatively unresponsive to pressure and temperature changes, as detected by the neural network model or otherwise, an alert may be generated which indicates that a leak is detected in a low pressure, closed loop, and/or an electronics cavity region. The neural network model or otherwise may be trained and/or otherwise configured to detect and categorize other types, kinds, and/or locations of leaks based on other particular data signatures (e.g., based on temperature and pressure relationships at certain conditions) and provide alerts accordingly which identify the types, kinds, and/or locations of such detected leaks.

While monitoring data from windows during anticipated, routine illumination level changes (e.g., backlight ramp up during sunrise) are sometimes shown and/or described, alternatively or additionally, the unit(s) 10 may be operated to create conditions for checking for leaks. For example, without limitation, the backlight, or other illumination source levels may be changed by command, such as from the controller 20, fan 15 speed may be changed to induce pressure and/or temperature changes, side assemblies 14 or other access panels may be rapidly closed, pumps may be attached to units 10, combinations thereof, or the like. In this way, units 10 may be field tested at any time for leaks. A field test may be performed in lieu of, or in addition to, routine daily testing, for example, such as to confirm findings.

The pressure data points shown and/or described herein are preferably differential pressure readings (i.e., relative to ambient pressures) though such is not necessarily required.

As used herein, substantially real time may include accounting for normal transmission and/or processing times, such as without any intentional delays of more than a few seconds or minutes. In other exemplary embodiments, the data may be stored for a period of time and processed later, such as when resources are available.

The local controller 20 may comprise one or more servers, computing devices, electronic storage devices, processors, combinations thereof, or the like.

While a display with a backlight (e.g., directly backlit LCD) is sometimes discussed, those of skill in the art will recognize that other types of displays, such as self-emissive displays (e.g., OLED) or other lighting arrangements (e.g., edge lighting) may be utilized.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectivity components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A computer-implemented method for identifying poorly sealed display units, said method comprising:

receiving pressure and temperature data from pressure and temperature sensors of the display units, where each of said display units comprises at least one electronic display, a closed airflow pathway and fans located along the closed airflow pathway for moving circulating gas through the closed airflow pathway, when activated;

training a neural network in a supervised learning fashion on the data;

receiving additional pressure and temperature data from pressure and temperature sensors of a same or different set of display units ("analyzed units"), wherein each of the sensors for a respective one of the display units is located along, or in fluid communication with, the closed airflow pathway;

analyzing the additional data using the neural network to identify any one or more of the analyzed units that are poorly sealed ("indicated unit(s)"); and causing an alert to be transmitted to at least one remote electronic device, the alert comprising identifying information for the indicated unit(s).

2. The method of claim 1 wherein:

each of the display units comprises a plurality of the pressure sensors and a plurality of the temperature sensors.

3. The method of claim 2 wherein:

each of the display units comprises a directly backlit liquid crystal display provided in a ruggedized enclosure.

4. The method of claim 2 wherein:

the data and the additional data for each of the display units is taken over a respective period of time and is time correlated.

5. The method of claim 4 wherein:

each of the display units comprises an illumination device for an electronic display layer thereof; and each of the periods of time comprises a period of increasing illumination levels for the illumination devices of the display units comprising sunrise and/or a period of decreasing illumination levels for the illumination devices comprising sunset, where the periods of time are different for at least some of the display units.

6. The method of claim 5 wherein:

the data comprises examples of high correlation between pressure, temperature, and illumination levels indicating a sufficiently well sealed unit and low correlation between pressure, temperature, and illumination levels indicating a poorly sealed unit; and the periods of time include when various ambient weather conditions were encountered for the display units.

7. The method of claim 6 further comprising:

applying a loss function comprising the Adam optimizer with a learning rate of 0.001, to the data to optimize coefficients of the neural network.

8. The method of claim 6 further comprising:

separately categorizing the examples from the data having a differential pressure reading under 50 pascals as catastrophic failures;

separately analyzing the additional data for differential pressure readings which remain under a maximum pressure potential of fans of the analyzed units; and separately indicating, in the alerts, any of the one or more of the indicated unit(s) which qualifies as a catastrophic failure.

9. The method of claim 6 wherein:

the neural network comprises only two hidden layers.

10. The method of claim 9 wherein:

a new algorithm is created which preemptively performs calculations in a first one of the two hidden layers as the additional data is received before calculating a second one of the two hidden layers.

11. The method of claim 10 wherein:

the hidden layers utilize a rectified linear unit activation function; and an output layer utilizes a sigmoid equation or a hyperbolic tangent function.

12. The method of claim 6 wherein:

each of the display units is located remote from one another;

the neural network is stored at one or more non-transitory electronic storage devices located remote from the display units; and the analysis is performed by one or more processors located remote from the display units.

13. The method of claim 12 further comprising:

gathering the additional data on a daily basis for the analyzed units; and analyzing the additional data and generating the alerts on a daily basis for the analyzed units.

14. The method of claim 1 further comprising:

analyzing the additional data utilizing a rate inversion algorithm to identify a rate of temperature change and a rate of pressure change for each of the analyzed units;

identifying any of the analyzed units as being poorly sealed where the rate inversion algorithm determines that the rate of temperature change is above zero and the rate of pressure change is below zero; and only causing the alert to be transmitted where the rate inversion algorithm also indicates that the indicated unit(s) is/are poorly sealed.

15. The method of claim 1 further comprising:

causing a conditions change to generate the additional pressure and temperature data, said conditions change including at least one of: changing an illumination level of the display units, changing a fan speed of fans of the display units, and closing a door of the display units.

16. A system for identifying poorly sealed display units, said system comprising:

a network of display units, each comprising a closed airflow pathway, fans located along the closed airflow pathway, an electronic display, and at least one pressure sensor and at least one temperature sensor located along, or in fluid communication with, the closed airflow pathway; and one or more servers, remote from the display units, and comprising software instructions stored at one or more non-transitory electronic storage devices of the one or more servers, which when executed, configure one or more processors of the one or more servers to:

query the sensors of the display units for data;

analyze the data using a neural network trained on pressure and temperature data from the display units in the network and/or other display units to identify any one or more of the display units that are poorly sealed ("indicated unit(s)"); and cause an alert to be transmitted to at least one remote electronic device comprising identifying information for the indicated unit(s).

17. The system of claim 16 wherein:

the one or more servers comprise additional software instructions stored at the one or more non-transitory electronic storage devices, which when executed, configure the one or more processors to:

analyze the data utilizing a rate inversion algorithm to determine for each of the display units, a rate of temperature change and a rate of pressure change;

identify any of the display units as being poorly sealed where the rate inversion algorithm determines that the rate of temperature change is above zero and the rate of pressure change is below zero; and only cause the alert to be transmitted where the rate inversion algorithm also indicates that the indicated unit(s) is/are poorly sealed.

18. A display unit which alerts when poorly sealed, said display unit comprising:

a closed airflow pathway;

fans located along the closed airflow pathway;

an electronic display;

pressure and temperature sensors located along, or in fluid communication with, the closed airflow pathway; and one or more non-transitory electronic storage devices comprising software instructions, which when executed, configure one or more processors of display assembly unit to:

query the pressure and temperature sensors for pressure and temperature data;

analyze the data using a neural network trained on pressure and temperature data from the display unit and/or another set of one or more display units to identify if the display unit is poorly sealed; and where the analysis indicates that the display unit is poorly sealed, cause an alert to be transmitted to at least one remote electronic device comprising identifying information for the display unit.

19. The display unit of claim 18 wherein:

the one or more non-transitory electronic storage devices comprise additional software instructions, which when executed, configure the one or more processors to:

analyze the data utilizing a rate inversion algorithm to determine, for each of the units, a rate of temperature change and a rate of pressure change;

identify any of the units as being poorly sealed where the rate inversion algorithm determines that the rate of temperature change is above zero and the rate of pressure change is below zero; and only cause the alert to be transmitted where the rate inversion algorithm also indicates that the display unit is poorly sealed.

20. A computer-implemented method for identifying poorly sealed display units, said method comprising:

receiving pressure and temperature data from pressure and temperature sensors of the display units, where each of said display units comprises at least one electronic display;

training a neural network in a supervised learning fashion on the data;

causing a conditions change to generate additional pressure and temperature data, including at least one of: changing an illumination level of the display units, changing a fan speed of fans of the display units, and closing a door of the display units;

receiving the additional pressure and temperature data from pressure and temperature sensors of a same or different set of display units ("analyzed units");

analyzing the additional data using the neural network to identify any one or more of the analyzed units that are poorly sealed ("indicated unit(s)"); and causing an alert to be transmitted to at least one remote electronic device, the alert comprising identifying information for the indicated unit(s).

* * * * *